(12) United States Patent
Simmons et al.

(10) Patent No.: US 6,276,699 B1
(45) Date of Patent: Aug. 21, 2001

(54) SNOW MACHINE SKI

(76) Inventors: Verlin M. Simmons, 495 S. Main St.; Val J. Simmons, 720 S. 300 East, both of Providence, UT (US) 84332

(*) Notice: Subject to any disclaimer, the term of this patent is extended or adjusted under 35 U.S.C. 154(b) by 0 days.

(21) Appl. No.: 09/196,031

(22) Filed: Nov. 18, 1998

Related U.S. Application Data

(60) Provisional application No. 60/075,881, filed on Feb. 25, 1998.

(51) Int. Cl.$^7$ ................................................ B62B 17/00
(52) U.S. Cl. ........................................... 280/28; 280/609
(58) Field of Search ..................... 280/28, 14.2, 22.1, 280/609, 21.1

(56) References Cited

U.S. PATENT DOCUMENTS

| | | | |
|---|---|---|---|
| D. 256,224 | 8/1980 | Fritz | D12/7 |
| D. 366,014 | 1/1996 | Lindquist | D12/7 |
| 2,038,077 | * 4/1936 | Haglund | 280/609 |
| 3,675,939 | * 7/1972 | Vik | 280/28 |
| 3,711,109 | 1/1973 | Hofbauer | 280/28 |
| 3,738,676 | 6/1973 | Hand . | |
| 3,817,544 | * 6/1974 | Labelle | 280/28 |
| 4,491,333 | 1/1985 | Warnke | 280/28 |
| 5,145,195 | 9/1992 | Campbell et al. | 280/28 |
| 5,145,201 | 9/1992 | Methany | 280/609 |
| 5,344,168 | * 9/1994 | Olson et al. | 280/28 |
| 5,360,220 | 11/1994 | Simmons | 280/28 |
| 5,700,020 | 12/1997 | Noble | 280/28 |
| 5,868,405 | * 2/1999 | Lavecchia et al. | 280/28 |
| 6,012,728 | * 1/2000 | Noble | 280/28 |

OTHER PUBLICATIONS

Steve Ingram, *American Snowmobiler*, "The V–Trac Snowmobile Ski", Recreation Dynamics.
Starting Line Products, Inc., Catalog, "SLP Tri–Keel Skis", 1998.

* cited by examiner

*Primary Examiner*—Richard M. Camby
(74) *Attorney, Agent, or Firm*—Brian C. Kunzler

(57) ABSTRACT

A ski for a snowmobile or other snow machine is provided with a central channel for increasing the flow of snow under a gliding surface at the bottom of the ski. The increased flow of snow enhances flotation of the ski. The channel may be formed by two keels, one disposed to either side of a gliding surface of the ski. A series of longitudinal grooves may also be formed within the contoured gliding surface, alternately interspersed with lands. The grooves and lands increase a shear force exerted against the snow over which the ski travels, when the orientation of the ski is altered out of the line of travel. The increased shear force causes the snowmobile to consistently follow the course of the ski, improving tracking and handling of the ski. The grooves are preferably of a uniform depth and width and may be disposed within the entire gliding surface or only a portion thereof The grooves preferably follow the contours of the gliding surface, and as such, may be disposed at different vertical locations on the gliding surface. A method of improving the steering control of a snow machine includes in one aspect cutting a series of grooves such as those discussed above into a gliding surface of a preexisting snow machine ski.

20 Claims, 2 Drawing Sheets

SNOW MACHINE SKI

RELATED APPLICATIONS

This application is a continuation-in-part of my co-pending provisional patent application, Ser. No. 60/075,881, filed on Feb. 25, 1998 for Snowmobile SKI WITH GROOVED BOTTOM SURFACE.

BACKGROUND OF THE INVENTION

1. The Field of the Invention

The present invention relates to skis for enhancing the flotation and steering response of powered snow machines. More particularly, the present invention relates to skis with a channel or other contours on a gliding surface at the bottom thereof and grooves formed within the contours for increasing the flotation ability, steering response, and turning ability of the ski.

2. The Relevant Technology

Technology has made it possible to travel off-road during winter, even in very remote areas. Current machines for traveling over snow, such as snowmobiles, for example, provide the ability to travel swiftly and safely in backcountry locations where the terrain is quite rugged. Water sports industries such as recreational vehicle sales and rentals and tourism are growing rapidly as a consequence of this new technology. Industry and rescue operations are also benefitting greatly.

Snow machines continue to be refined and improved. For instance, in the case of snowmobiles, improved performance and reliability allows operators to travel swiftly, safely, and comfortably into secluded regions otherwise inaccessible in winter and in some cases in summer also. Other technological advances, such as increased traction and power and weight reduction, are allowing snowmobiles to be operated in snow depths and mountains slopes of a steepness previously unthinkable.

The snowmobile is a light and agile tracked snow machine that is intended primarily for recreational operation by one or two persons. The small size, lightness, and high power output of these machines makes them highly responsive to shifts in weight and other operator inputs. Using tracks with large lugs and high powered engines, these machines can go faster over trails and deeper in rugged terrain than larger snow machines such as the dual tracked, multiple passenger vehicles currently available. The ruggedness of snowmobiles allows operators to travel over the snow safely at speeds impossible to match by wheeled vehicles in summer and to travel directly to any desired point by "as-the-crow-flies" navigation.

Typically, a snowmobile comprises a long rubberized track about 3 or 4 feet in length. The snowmobile is driven by an engine and the power is applied to the track with the use of a centrifugal clutch. Unlike dual-tracked snow machines, the snowmobile track does not extend entirely to the front of a snowmobile. Instead, the front of the machine rests on one or two specially adapted skis. The skis are attached to the steering mechanism of the snowmobile which may be provided with suspension components to handle bumps. With the use of the handle bars, the operator is able to alter the facing of the skis. Turning the skis in a selected direction generally causes the snowmobile to follow the selected direction of travel of the skis and turn in that direction.

It is believed by the inventors that the skis are a critical component to the steering, tracking, and flotation ability of the snowmobile. As snowmobiles have improved in other aspects, it is believed that the ability of the skis to provide flotation, properly control the snowmobile, and maintain an intended direction of travel have lagged behind.

Conventional snowmobile skis are designed under the notion that to provide the highest degree of speed and flotation, the ski must be smooth and relatively flat. Thus, conventional snowmobile skis are typically smooth and flat. A single shallow keel or wear bar is typically provided extending along the center of the ski to exert a lateral shear force against the snow when the ski is turned, forcing the ski to adhere to an intended direction of travel.

Such an arrangement works at lower speeds and in relatively packed snow. Nevertheless, as speeds increase, and/or as the snow becomes increasingly light and powdery, the shear force exerted by the ski against the snow when turning becomes insufficient to overcome the inertia of the snowmobile.

Consequently, when the conventional snow machine skis are turned in a direction other than the direction of travel of the snow machine to which they are fitted, a high degree of lateral slippage frequently occurs. The sliding of the conventional skis in the original direction of travel is termed "pushing." Pushing makes it difficult to traverse steep terrain and can make even normal trail operation of the snow machine dangerous.

Due to the tendency to push, snowmobiles with conventional skis must be directed straight up the face of a steep slope, rather than traversing it. In attempting to traverse less steep hills, a skilled operator can often keep the snowmobile upright and maintaining an intended direction of travel to some degree, but the skis still often fail to hold a straight course and may slide sideways, down the hill. When this occurs, the snowmobile may tip over, unseating the operator and possibly rolling out of control down the hill.

Additionally, when attempting to turn the snowmobile sharply on even packed surfaces when traveling at a high rate of speed, the skis can break loose suddenly, throwing the snowmobile off the trail. This can result in the snowmobile crashing into trees, snow banks, or other objects.

A further characteristic of conventional snow machine skis is the tendency to sink through soft, top layers of snow and catch on underlying ruts or other sharp contours in the path of the snow machine. This digression from the intended course is referred to as "darting." Darting, like pushing, can make it very difficult to maintain control of the snow machine, especially at high speeds. One main reason that darting occurs is that the conventional single keel skis tend to seek the same tracks as skis that have previously passed down the trail. Highly traveled trails can be covered with such tracks. Conventional skis tend to seek the tracks, and may jump or dart back and forth seeking first one set of tracks, and then a second, third, etc.

Conventional skis also exhibit shortcomings in the area of flotation in deep powdered snow. Typically, in such snow conditions, a high rate of speed can keep the snowmobile planing at the surface. However, on steep slopes that are covered with snow that is powdery and light so as to fail to provide a packable base to support the snowmobile below a certain speed, the snowmobile often loses its momentum. In such a case, the skis will begin to sink into the snow. When this occurs, the track begins to dig a trench. Unless the snowmobile regains its momentum, the trench will continue to grow until the snowmobile becomes firmly stuck. Such a situation can be very dangerous, as the operator may become stranded.

Thus, as technological barriers are being overcome, certain limitations of current snow machines have come glaringly to light. To fully utilize current technological benefits, snowmobiles must be provided with increased flotation ability, steering ability, and tracking capability. Until these needs are met, much terrain will remain impassible or at least dangerous to the operators of snow machines.

One problem with attempting to concurrently increase both the flotation and turning ability of a snowmobile ski is that the two re often antithetical to each other. That is, a broader, flatter ski is known to be desirable for flotation, while a narrower and deeper ski with sharp edges is desired for greater turning ability. Thus, the inventors have recognized a need for a ski with increased shear force for greater turning ability and steering response, but while still maintaining low friction and high flotation ability.

Such a ski would be even more useful if able to overcome the problems mentioned above of pushing and darting. If such as ski could be used to provide high floatation in powder snow and also provide improved steering on packed and groomed surfaces, the ski would be a great improvement in the art, complementing the technological advances already made. Such a ski would provide increased winter access to rugged terrain, greater enjoyment to consumers, and greater safety for those traveling off-road in winter.

OBJECTS AND BRIEF SUMMARY OF THE INVENTION

The apparatus of the present invention has been developed in response to the present state of the art, and in particular, in response to the problems and needs in the art that have not yet been fully solved by currently available snow machine skis. Accordingly, it is an overall object of the present invention to provide a ski for a snow machine that overcomes many or all of the above-discussed shortcomings in the art.

To achieve the foregoing object, and in accordance with the invention as embodied and broadly described herein in the preferred embodiment, an improved snow machine ski is provided. The snow machine ski is preferably provided with a central channel for increasing the flow of snow under a gliding surface at the bottom of the ski. The increased flow of snow enhances flotation of the ski. The channel may be formed by two pontoons, one disposed to either side of a gliding surface of the ski.

A series of longitudinal grooves may also be provided and may be alternately interspersed with lands on the gliding surface. The grooves are preferably of a uniform depth and width and may be disposed over the entire gliding surface or may be disposed on only a portion thereof.

The grooves and lands increase a shear force exerted against the snow over which the ski travels when the orientation of the ski is altered out of the line of travel. The increased shear force assists the ski in tracking in an intended direction corresponding to the facing of the ski, thereby improving the steering capability of the snow machine. The grooves preferably follow the contours of the gliding surface, and as such, may be disposed at different vertical locations on the gliding surface.

A method of improving the steering control of a snow machine includes in one aspect cutting a series of grooves such as those discussed above into a gliding surface of a snow machine ski.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENT

The present invention may be embodied in a snow machine ski design that improves the ski's ability to float on top of loose snow, track straight in all terrain, maneuver effectively on steep hills, and turn sharply in all snow conditions. Other embodiments of the snow machine ski of the present invention have been disclosed in U.S. Pat. No. 5,360,220 and U.S. patent application Ser. No. 08/213,950, both of which are hereby incorporated by reference into this document.

Figure 1:
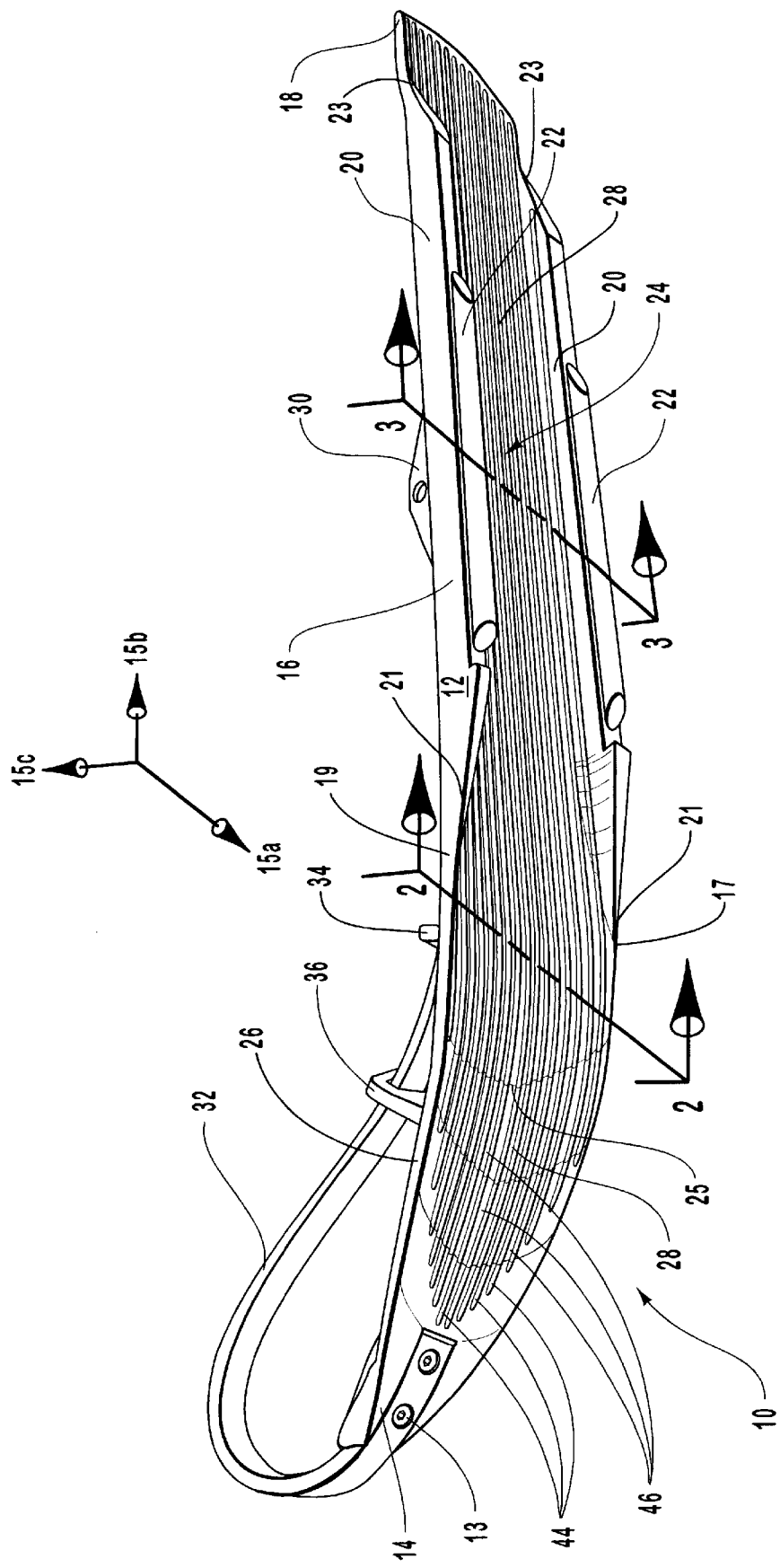
FIG. 1 is a perspective view illustrating an embodiment of a snow machine ski of the present invention in which the ski is provided with a contoured gliding surface including a channel and a plurality of grooves and lands arrayed across the channel.
Figure 2:
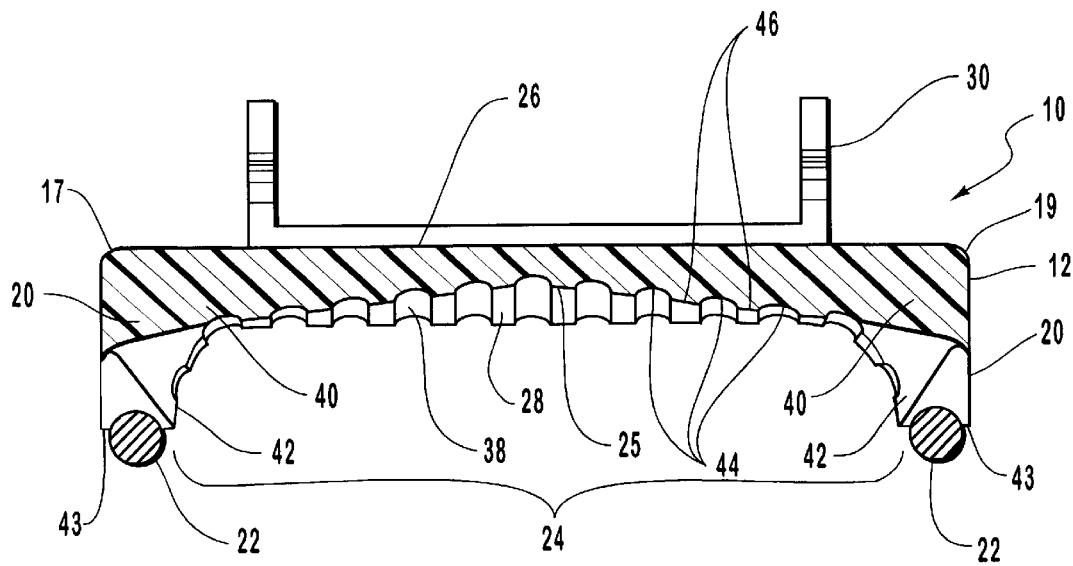
FIG. 2 is a cross-sectional detail of the ski of FIG. 1 taken around line 2—2 of FIG. 1.
Figure 3:
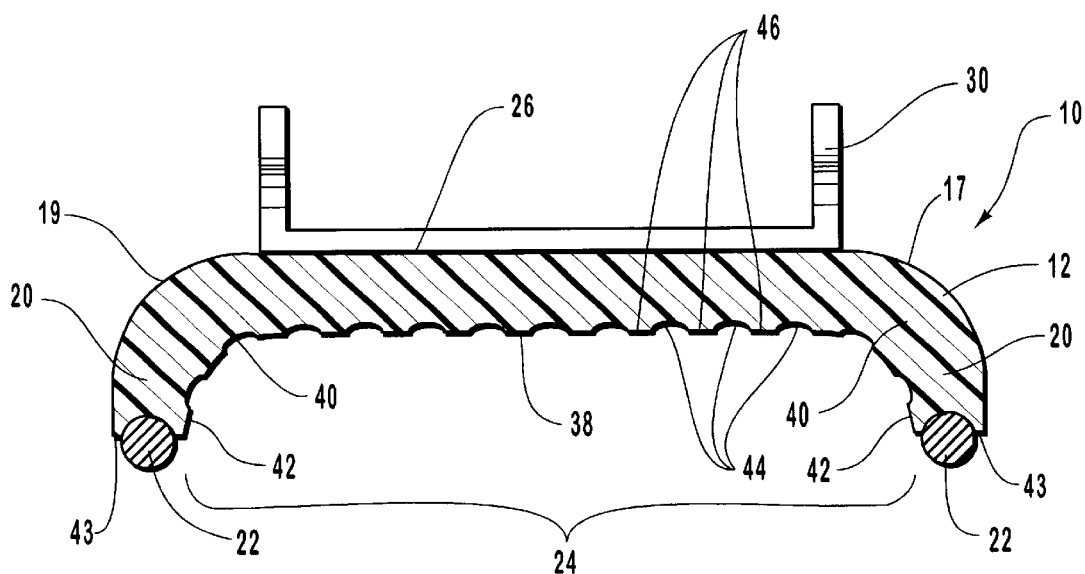
FIG. 3 is a cross-sectional detail of the ski of FIG. 1 taken around line 3—3 of FIG. 1.

FIGS. 1 through 3 show a snow machine ski 10 in accordance with the present invention. As seen in FIG. 1, the snow machine ski 10 has a body 12 functionally divided into an upturned tip 14, a tail 18, and an intervening base portion 16. The body 12 of the snow machine ski 10 extends in a longitudinal direction 15a from the tip 14 through the tail 18 and has a width extending in a lateral direction 15b between a first edge 17 and a second edge 19. The body 12 also has a depth in a vertical direction 15c.

The body 12 is shown varying in depth, and is thinner at the center and thicker at the edges 17, 19. The depth of the body 12 also varies between the thicker base portion 16 and the thinner tip 14 and tail 18. The thickness of the base portion 16 provides a stiffness that aids in maintaining flotation and steering ability, while the comparatively thinner tip 14 and tail 18 impart flexibility. Flexibility allows the tip 14 to bend, aiding the ski to "climb" out of and remain on the surface of deep snow. The flexibility of the tip 14 and tail 18 also affords a shock absorption ability to the snow machine ski 10.

The body 12 and loop 32 of the snow machine ski 10 are preferably homogeneously molded from a material with a low coefficient of friction on snow and ice and a low modulus of elasticity relative to that of metal. In one embodiment the material is a polymer or plastic. In one presently preferred embodiment, the body 12 is injection molded from a durable thermoplastic material such as Tivar® UHMW. Forming the snow machine ski 10 from plastic also reduces the weight and increases the flexibility of the snow machine ski 10.

A top surface 26 of the snow machine ski 10 has provided thereon a means for connecting to a the steering mechanism of a snow machine. In the depicted embodiment, a mounting bracket 30 is provided for connecting to a steering spindle of a snowmobile. A loop 32 may be provided to act as a bumper for protecting the front of the ski from impacts, while also providing a gripping handle for the operator. The loop 32 is preferably dynamically mounted at one or both ends, providing flexibility and shock absorption to the tip 14.

In the depicted embodiment, the loop 32 is fixedly attached to the tip 14 of the ski 10 with bolts 13. The loop 32 bends up and back, transitioning through a first apertured sliding brace 36, and through a second apertured sliding brace 34. A free end of the loop 32 (not shown) is movable in a longitudinal direction with respect to the braces 34, 36, allowing it to flex within the braces 34, 36. This arrangement allows the tip 14 to flex backwards and absorb shock normally transmitted through conventional snow machine skis.

A concavity 25 is shown formed in a gliding surface 28 of the ski 10 beginning at the tip 14. In the depicted embodiment, two elongated keels 20 protrude downward from the edges 17, 19 of the base portion 16. While the keels 20 may extend over the length of the bosy 12, each of the keels 20 preferably extends longitudinally along the bottom of the base portion 16, and is not present on the tip 14 or the tail 18.

The keels 20 are shown in cross-sectional views in FIGS. 2 and 3. The keels 20 preferably have interior sides 42 forming a corner with the bottoms 43 of the keels 20. Preferably, these corners are substantially square to provide lateral shear force on snow within the channel 24 when turning the ski 10. Of course, the gliding surface 28 could be otherwise configured, but is preferably contoured in some manner. It is nevertheless within the scope of the patent that the gliding surface 28 could be totally flat and without contours.

Shown connected to the bottom 43 of each of the keels 20 in the depicted embodiment is an elongated metal wear bar 22. The wear bars 22 are designed to make primary contact with harder surfaces, such as roadways and packed or icy snow, to prevent wear. The wear bars 22 are also designed to focus the weight of the snow machine on a smaller surface area, acting as runners and guides for improved steering control. Of course the wear bars 22 could be eliminated from the keels 20. Alternatively, a central keel could be employed as is commonly employed in the art in addition to the keels 20 and a wear bar 22 could be disposed on the central keel rather than on the keels 20.

A channel 24 is shown defined by the gliding surface 28, the concavity 25, and the keels 20. The depicted channel 24 extends in the longitudinal direction 15a along the gliding surface 28 of the ski 10, toward the tail 18, where the ski 10 is depicted as being substantially flat. Consequently, the channel 24 is shallow at the tip 14, and increases in depth 13a as it transitions to the waist 16 or base portion 16, then decreases in depth 13a as it progresses rearward from the base portion 16 toward the tail 18.

The channel 24 maintains a substantially consistent depth and thickness across the base portion 16, where the keels are preferably about one inch in depth and of a thickness 23 of approximately one half inch in order to reinforce the base portion 16. In the depicted embodiment the forward tip of each of the keels 20 wedges outward laterally, narrowing in a lateral direction 15b, as the keel 20 progresses longitudinally from a forward apex 21 rearward. The keels 20 each also wedge inward at the rear toward a rear apex 23.

The wedging of the keels 20, together with the concavity 25 helps to gather and funnel snow into the front of the channel 24, providing lift to the snow machine ski 10 when the snow machine ski 10 is mounted to a snow machine that is being driven across snow. The wedging at the rear of the keels 20 allows the snow to freely exit from the rear of the channel 24.

In the depicted embodiment, the keels 20 are shown wedging downwards from the forward apex 21 rearward. The keels 20 wedge upward again as the keels progress toward the rear apex 23. This vertical wedging helps to provide less friction, allow the ski 10 to overcome obstacles, and further increasing flotation of the ski 10.

Snow has been found to behave much like a fluid when it is in a fresh, highly crystalized, cold and unpacked "powder" form having a large void fraction of air. Accordingly, the tip 14 of the ski 10 is longer than the tail 18, and has a comparatively higher surface area on the snow. Consequently, the tip 14 planes up and out of snow, while the tail 18 will tend to sink more than does the tip 14. The resulting angle of the ski 10 with respect to the surface of the snow causes the tip to "climb" upward out of the snow, so that the ski 10 planes to the surface. On top of the snow, the ski 10 flattens out as it seeks equilibrium.

Additionally, the above-described geometry of the keels 20 and concavity of the tip 14 together funnel snow into the channel 24 where it is captured under ski 10. When the ski 10 is moving relative to the snow, the density of the high volume of snow funneled under the ski 10 is captured within the channel 24. The high volume and momentum of snow flowing into the channel 24 also provides lift to the tip 14, providing additional flotation to the ski 10, and thus to the snow machine to which the ski 10 is attached.

Additionally, the snow under the ski can be considered equivalent to a fluidized bed from fluid dynamic principles. It is desirable to create a high pressure at the center of the ski 10 to create a high degree of flotation in the snow under the ski. One manner of so doing is by maximizing the volume of the channel. This creates a large surface area for planing over the snow. It also provides a low resistance of flow through the channel.

In one embodiment, the channel 24 has a hydraulic diameter that has been maximized for the surface area of the gliding surface 28 by making the channel 24 cover substantially the entire width of the snow machine ski between the keels 20 and by radiusing the corners 40 where the keels 20 originate. The maximized hydraulic diameter of the present invention decreases resistance to the flow of snow, thereby allowing a high volume of snow to freely pass through the channel 24 and to more evenly distribute pressure in all directions 15a, 15b, 15c.

Thus, the ski 10 of the present invention provides for a maximized resistance to snow in the vertical direction 15c, while providing a minimum of resistance to the flow of snow in the longitudinal direction 15a. The upturned tip 14 of the ski provides a transitional contact surface to snow when the ski is sunken within the snow to provide a maximum resistance, causing the ski to climb up out of the snow, and also directing the flow of snow through the channel 24.

In order to provide a high surface area for higher vertical resistance and increased planing, the snow machine ski 10 may be wider than conventional skis. In the presently preferred embodiment, the body 12 is about six inches in width. The top surface 26 of the snow machine ski 10 may be flat, which keeps the ski 10 light and renders the relatively thin tip 14 and tail 18 more flexible. The base portion 16 preferably does not substantially flex, and is relatively deep to provide strength and reinforcement. The keels 20 also lend feather structural rigidity to the base portion 20. In order to further keep weight to a minimum, while imparting strength, the body 12 is shown being of a substantially constant width through the base portion 16.

To accommodate these considerations while sacrificing only a minimal increase in resistance to the flow of snow, the top of the channel 24, as depicted in FIG. 2, may be substantially flat across the center 38 and radiused at the corners 40. Thus, the channel 24 may approximate the shape of a half cylinder, for instance, further increasing hydraulic diameter and decreasing resistance to the longitudinal passage of snow past the snow machine ski 10.

The ski 10 also capitalizes upon principles of mechanical dynamics and material properties when turning. Typically, two snow machine skis 10 are employed on a snow machine, mounted to spindles at the front of the snow machine. Handlebars pivotally link to the spindles to allow the operator to turn the spindles, and the snow machine skis 10. The spindles are typically set at a forward slant to provide camber for stability and turning dynamics. Thus, when the handlebars are turned, the snow machine skis 10 also turn and, due to the slanting, are caused to can to one side. This canting causes the inside wear bar 22 and keel 20 to "bite" or dig in to the snow. Mounting the Keels 20 at the outside of the body 12 causes a substantially greater bite compared to the centrally mounted keels of conventional skis. Additionally, the dual keels provide a greater bite by the virtue of a greater lateral surface area presented to the snow when the ski is turned into a new direction of travel.

The perpendicular orientation of the keel 20 to the base 16 creates a substantial shear force against the snow when the ski 10 is turned, much like thrusting the blade of a snow shovel into a bank of snow. The shear force is enhanced by the large volume of snow captured within the channel 24. The snow within the channel also has an adhesion to the snow around it, much like the snow within a snow shovel. This creates a greater shear force and consequently a resistance to pushing, causing the ski 10 to better follow the intended direction of travel.

Because the majority of tracks on snowmobile trails are made by conventional, single keel skis, the ski 10 of the present invention will tend to make its own path, corresponding to the direction of intended travel of the operator. Consequently, the ski 10 will not seek after preexisting tracks as do conventional skis, and darting has been found to be substantially eliminated.

To further overcome the problems of pushing and darting in all conditions, a series of longitudinal grooves 44 may be formed in the gliding surface 28 of the snow machine ski 10. The grooves 44 increase the lateral surface area for gripping the snow when the snow machine ski 10 is turned relative to the facing of the snow machine. Nevertheless, the unobtrusive narrow width and shallow nature of the grooves allow the gliding surface 28 to be relatively smooth, allowing for low longitudinal friction.

A series of lands 46 are formed between the grooves 44. The lands 46 are preferably much wider than the grooves 44, forming the majority of the gliding surface 28. It is preferred that the lands 44 provide a flat contact surface at the tip thereof. In this manner, the gliding surface has a substantially flat and continuous contour, broken only by the grooves 44.

The alternately grooved/ribbed gliding surface 28 of the ski 10, as described, also increases the shear force available to hold the snow machine ski 10 in the desired lateral position. Moreover, the keels 20 tend to capture and pack into the grooves the snow in turns using the skis 10 momentum.

Snow accumulated within the high surface area of the grooves 44 provides greater adhesion to underlying snow than does the plastic of the ski, which is typically chosen for its lack of friction with the snow. Accordingly, an accumulated shear strength of the snow in the grooves is added to that already provided by snow contacting the keels 20 and the wear bars 22 to decrease pushing and thereby greatly improve steering control. An added benefit to the addition of the grooves 44 is an increase in the tracking ability of the snow machine ski 10 as the snow shear supports shear forces in the plane 15a–15b to make miniature keels 20 of the lands 46. Consequently, the ski 10 is not easily deflected out of its intended course and darting is reduced to an even greater degree.

Preferably, four or more grooves 44 are formed in the gliding surface 28 of the snow machine ski 10. Six or more grooves is even more preferred. In certain embodiments, about 10 to 15 grooves are arranged across the ski gliding surface 28. The grooves 44 are preferably shallow relative to the thickness of the body 12. Preferably, the grooves 44 are less than about ½" in depth. More preferably, the grooves 44 are less than about ¼" in depth. In one preferred embodiment, the grooves 44 are about 0.040 inches deep and about 0.180 inches wide, providing an aspect ratio of width (direction 15b) to depth (direction 15c) of about four.

The grooves 44 may be separated by a constant distance of about one half inch. The grooves 44 are preferably linear, and constant in width and depth. In the embodiment of FIG. 2, the grooves 44 are arcuate in cross section. The grooves 44 may also be square, rectangular, triangular, radiused, or of other cross-sectional shape selected to provide the desired performance in a particular type of snow. In one embodiment, the grooves 44 extend substantially from the tip 14 to the tail 18, and are uniformly spaced across the center portion 38. Also one or more grooves may be formed in each of the corners 40 and the sides 42 as shown.

Of course, it will be apparent to one skilled in the art that the grooves 44 may be configured in other, selected dimensions, cross-sectional shapes, and configurations to balance competing consideration discussed herein. For instance, deepening the grooves 44 tends to increase the responsiveness of the snow machine skis 10 to a change in course, as does increasing the width and number of the grooves 44 and steepening the sides of the grooves 44. Nevertheless, increasing the responsiveness of the snow machine skis 10 in this manner can be dangerous to an inexperienced operator or one who is not informed of the increased handling capability of the ski 10.

Furthermore, increasing the number, depth, width and steepness of the grooves increases the snow-supportable shear in the plane 15a–15b, thus increasing the force required by the operator to turn the snow machine skis 10 relative to the facing direction of the snow machine.

The grooves 44 preferably follow the lateral contour of the snow machine skis 10. Accordingly, in the depicted embodiment of FIGS. 1 and 2, a portion of the grooves 44 are formed within the channel 24. The grooves 44 may thus form a concavity within a concavity, where the outer concavity comprises the channel 24 and the inner concavity comprises the grooves 44. Also, an array of linear, substantially identical shallow grooves 44, may longitudinally 15a traverse substantially the entire gliding surface 28 of the snow machine ski 10.

Snow accumulated in the grooves 44 between the keels 20 packs under the skis 10. According to St. Venant's principle and the concept of principal stress planes, the total, supportable shear load strength may be increased in the snow by the multiplicity of shallower grooves 44, as compared with a smooth cavity 24 or gliding surface 28. This maximizes the effective hydraulic radius at high speed for flotation while also maximizing lateral shear forces to prevent the snow machine ski 10 from sliding in the direction of travel of the snow machine when turning.

As discussed, in operation of the snow machine, especially at comparatively higher speeds in powder snow, the snow machine skis may function effectively upon principles of fluid dynamics, providing floatation (e.g., by tips 14 and channels 24) and ruddering (e.g., by keels 20) in deep or loose snow. The skis 10 may also effectively function upon principles of mechanical dynamics and solid mechanics of snow when the snow machine skis 10 are turned, slowed, etc., in wet or packed conditions, thus trapping and packing the snow within the channel 24 and the grooves 44, and causing the snow machine to turn sharply, responsive to a direction set by the operator.

Thus, the present invention comprises the harmonization of fluid dynamic principles with material properties and mechanical dynamic principles, embodied in the transition of the skis 10 from fluid dynamic operation to mechanical dynamic operation according to snow conditions, travel speed, and turning. In practice, the capturing of denser, heavier, or wetter snow in the channel 24, between the keels 20 and under the ski 10 in turn, tends to pack the snow, rather than allow it to escape, further improving responsiveness to the grooves 44.

The embodiment of the grooved ski 10 having a large hydraulic diameter and ruddering keels 20, in accord with the present invention, can be used with snow machine skis other than those described in detail herein. For instance, the design of the ski 10 of the present invention may also be used with snow machine skis that are flat or convex, that are made of metal, that are of single or multiple keels centrally located or otherwise, that are flexible or rigid or any combination thereof. The snow machine ski 10 of the present invention can also be used on all types of powered snow machines, including dual tracked "snow cat" snow machines and singe ski powered snow machines.

As discussed, the unique snow machine ski of the present invention provides snow machines so equipped with better tracking, control, and flotation over a broader range of speeds, snow conditions, and operating conditions over prior art snow machine skis. Furthermore, due to the reduction in pushing and darting, the snow machine ski of the present invention also provides a better ability traverse hills, allowing an operator to maneuver effectively on hills in any direction without being limited to going only straight up and straight down. This better control, tracking, "side hilling" and flotation allows access to locations that were previously inaccessible to vehicles in winter.

Consequently, not only is the present invention a significant benefit to winter recreation, it also provides a safety benefit as well. Snow machines can now be used in rescue, game management, technical studies, avalanche control, and the like, where terrain barriers previously allowed only helicopters and skiers to approach a location. Lives may be saved, time, labor, and risks of crashing and becoming stranded in inclement weather may be reduced.

What is claimed and desired to be secured by United States Letters Patent is:

1. An apparatus for use as a ski on a powered snow machine, the apparatus comprising:
    a base having a top adapted to be connected to a snow machine and a gliding surface disposed at the bottom thereof for traveling over snow, the gliding surface extending in a longitudinal direction positionable to correspond to a desired direction of travel and extending in a lateral direction between a first edge and a second edge;
    a keel integral to the base and disposed to extend downwardly from the base;
    a tip formed integrally with the base and extending forward longitudinally from the base;
    a tail formed integrally with the base and extending rearward longitudinally from the base; and
    a plurality of longitudinal grooves formed within the gliding surface adjacent to the keel for controlling tracking of the ski, the gliding surface forming blunted, open-tipped lands between the grooves.

2. The apparatus of claim 1, wherein the gliding surface is contoured and the grooves follow the contours of at least a substantial portion of the gliding surface.

3. The apparatus of claim 2, wherein the grooves are formed within the gliding surface at two or more different vertical levels of the contours of the gliding surface.

4. The apparatus of claim 1, further comprising a plurality of lands between the grooves, the lands each emanating from the base and having a substantially flat contact surface distal to the base.

5. The apparatus of claim 4, wherein the lands are substantially wider than the grooves such that the lands form a majority of the gliding surface to provide a minimum of friction with the snow in a longitudinal direction when the ski is pointed in a current direction of travel.

6. The apparatus of claim 4, wherein at least a substantial portion of the contact surfaces comprise a chamfered edge proximal an adjacent groove.

7. The apparatus of claim 1, wherein the gliding surface is substantially smooth and continuous except for the grooves, the gliding surface between the grooves comprising lands, the lands being of a substantially continuous contour disrupted only by the grooves.

8. The apparatus of claim 1, wherein the grooves are all of a substantially uniform depth and width.

9. The apparatus of claim 1, wherein at least four of the grooves are distributed across the gliding surface, and wherein the grooves are less than about one half inch in width and less than about one half inch in depth.

10. The apparatus of claim 1, wherein the grooves are less than about one quarter inch in width and less than about one eighth inch in depth.

11. The apparatus of claim 1, wherein at least six of the grooves are distributed across the gliding surface, each of the six grooves being substantially parallel to each other and being of substantially the same depth, said depth being uniform and constant across substantially the entirety of the six grooves.

12. The apparatus of claim 1, wherein the grooves are substantially linear and identical in depth and width across substantially the entire gliding surface, said depth and width being uniform and constant across substantially the entirety of the grooves.

13. The apparatus of claim 1, further comprising a longitudinal channel disposed within the base and occupying a majority of the gliding surface, the grooves formed within at least a substantial portion of the channel.

14. The apparatus of claim 13, further comprising a pair of elongated keels integral to the base and disposed to extend downwardly from the base proximate the first and second edges, respectively, to form the channel, the keels extending a distance selected to be effective to apply a turning force in the lateral direction to maneuver a snow machine in fluidized snow, the grooves formed within at least a substantial portion of the channel.

15. An apparatus for use as a ski on a powered snow machine, the apparatus comprising:

a contoured base substantially homogeneously molded from a thermoplastic material and having a contoured gliding surface disposed at the bottom thereof for traveling over snow, the gliding surface extending in a longitudinal direction positionable to correspond to a desired direction of travel and extending in a lateral direction between a first edge and a second edge;

a flexible tip formed integrally with the base and extending forward longitudinally from the base;

a tail formed integrally with the base and extending rearward longitudinally from the base;

at least six parallel longitudinal grooves of a substantially uniform depth of less than about one eight inch and a substantially uniform width of less than about one eighth inch and substantially following the contours of at least a substantial portion of the gliding surface for controlling tracking of the ski, said width and depth being substantially constant over at least a substantial portion of the contoured gliding surface; and a plurality of lands formed between the grooves, the lands being substantially wider than the grooves to occupy a majority of the gliding surface and each emanating from the base and having a substantially flat contact surface distal to the base, the lands being of a substantially continuous lateral contour disrupted only by the grooves.

16. An apparatus for use as a ski on a powered snow machine, the apparatus comprising:

a base having a gliding surface disposed at the bottom thereof for traveling over snow, the gliding surface extending in a longitudinal direction
positionable to correspond to a desired direction of travel and extending in a lateral direction between a first edge and a second edge;

a tip formed integrally with the base and extending forward longitudinally from the base;

a tail formed integrally with the base and extending rearward longitudinally from the base;

at least six longitudinal grooves formed within the gliding surface for controlling tracking of the ski, the gliding surface forming blunted, open-tipped lands between the grooves.

17. The apparatus of claim 16, wherein the grooves are formed within the gliding surface at two or more different vertical levels laterally across the base.

18. The apparatus of claim 16, further comprising a pair of elongated keels integral to the base and disposed to extend downwardly from the base proximate the first and second edges, respectively, to form a channel, at least one groove formed within the channel and extending along one side of a keel.

19. A method of modifying an existing snow machine ski to improve the steering control of the snow machine ski, the method comprising the steps of:

providing a base having a top adapted to be connected to a snow machine and a gliding surface disposed at the bottom thereof for traveling over snow;

providing a keel integral to the base and disposed to extend downwardly from the base;

cutting a first longitudinal groove into a the gliding surface of the ski adjacent the keel; and cutting a second longitudinal groove into the gliding surface of the ski adjacent the keel, the second longitudinal groove substantially parallel to the first longitudinal groove, with a blunted, open-tipped land formed between the grooves.

20. The method of claim 19, further comprising cutting a plurality of additional longitudinal grooves into the gliding surface, the additional longitudinal grooves substantially parallel to the first and second longitudinal grooves, each of the first, second, and additional longitudinal grooves having a width of less than about one half inch and a depth of less than about one quarter inch.

* * * * *

UNITED STATES PATENT AND TRADEMARK OFFICE
CERTIFICATE OF CORRECTION

PATENT NO. : 6,276,699 B1
DATED : August 21, 2001
INVENTOR(S) : Simmons et al.

Page 1 of 1

It is certified that error appears in the above-identified patent and that said Letters Patent is hereby corrected as shown below:

Column 3,
Line 10, the word "re" should read -- are --.

Column 4,
Line 67, "to a the" should read -- to the --.

Column 5,
Line 22, "bosy" should read -- body --.

Column 6,
Line 26, "under ski" should read -- under the ski --.

Column 9,
Line 41, "singe" should read -- single --.

Signed and Sealed this

Seventh Day of May, 2002

Attest:

JAMES E. ROGAN
*Attesting Officer*     *Director of the United States Patent and Trademark Office*